United States Patent [19]

Hayashi et al.

[11] 4,119,036
[45] Oct. 10, 1978

[54] ROCKET MOTOR COMPRISING COMBUSTIBLE CASE, NOZZLE, AND FINS

[75] Inventors: Minoru Hayashi, Tatsuno; Kazuo Kishi, Himeji, both of Japan

[73] Assignee: Daicel Ltd., Osaka, Japan

[21] Appl. No.: 848,740

[22] Filed: Nov. 4, 1977

Related U.S. Application Data

[63] Continuation of Ser. No. 628,503, Nov. 3, 1975, abandoned.

[30] Foreign Application Priority Data

Dec. 23, 1974 [JP] Japan .................................. 49-147810
Jan. 17, 1975 [JP] Japan .................................... 50-7607

[51] Int. Cl.² .......................................... F42B 15/10
[52] U.S. Cl. .................................. 102/49.3; 60/200 A
[58] Field of Search .................. 102/49.3, 34, DIG. 1; 60/200 A, 253, 254, 255

[56] References Cited

U.S. PATENT DOCUMENTS

| | | | |
|---|---|---|---|
| 2,977,885 | 4/1961 | Perry et al. | 60/253 |
| 3,032,970 | 5/1962 | Fox | 102/34 |
| 3,127,739 | 4/1964 | Miller | 60/251 |
| 3,326,129 | 6/1967 | Gould | 102/49.3 |

*Primary Examiner*—Samuel Feinberg
*Attorney, Agent, or Firm*—Blanchard, Flynn, Thiel, Boutell & Tanis

[57] ABSTRACT

A combustible rocket is constructed with a laminate which comprises high tensile strength metal foils, easily combustible metal foils, and easily combustible adhesive layers. The rocket has sufficient mechanical strength and its shell can be gasified or disintegrated into finely divided pieces after the propellant of the rocket has burnt out at high altitudes. This rocket can be launched safely even in the vicinity of population centers without risk of injury to living things.

22 Claims, 9 Drawing Figures

INVENTION

ROCKET MOTOR COMPRISING COMBUSTIBLE CASE, NOZZLE, AND FINS

This is a continuation, of application Ser. No. 628,503 filed Nov. 3, 1975, abandoned.

BACKGROUND OF THE INVENTION

1. Field of the Invention

This invention relates to a combustible rocket in which the structural elements of the rocket will combust at high altitudes after the rocket propellant has been burned out.

The term "combustible rocket" employed in this specification and claims means a rocket in which the rocket shell is gasified or disintegrated into finely divided pieces because of physical or chemical action after the rocket has been launched and the propellant has been burned out. The rocket shell is composed of a rocket chamber, a nose cone, an end plate, a nozzle, and fins. Thus, any parts of the rocket that return to earth are in a finely divided condition and their velocity is greatly reduced so that they will not injure humans and other living things that such particles may contact. Therefore, the rocket according to this invention can be safely launched in the vicinity of populated areas as well as above ground and at sea. Further, when a large multistage rocket according to this invention is launched, the separable rocket stages thereof will disintegrate so that they can fall in the vicinity of populated areas without any danger.

However, the foregoing rocket shell not only has an excellent combustibility, but also it is light weight and possesses sufficient mechanical strength to meet the performance requirements of rockets.

2.

Description of the Prior Art

The combustible shells or rocket chambers which have so-far been proposed are cylindrical combustible foils with the ends adhered, such as nitrocellulose film and nitrated paper, and glass fibers wound with a combustible adhesive. However, because these components do not have sufficient tensile strength, it has been necessary to increase their thickness so greatly that they do not possess satisfactory rocket performance. Further, the conventional rockets provided with sheet-formed or cord-formed explosive for blasting the shell apart are difficult to disintegrate into sufficiently finely divided pieces without impairing the rocket performance.

BRIEF DESCRIPTION OF THE DRAWINGS

The present invention will now be described by reference to the attached drawings, in which:

Referring to FIG. 1, there is shown a rocket comprising fins 1, a propellant charge 2, a rocket casing or shell 3, an imperforate end plate 4 disposed adjacent the inner end of the propellant charge, a supporting ring 5 for supporting the end plate 4, a flame resistant nozzle 6 at the rightward end of the rocket, a combustible filler 7 supporting the nozzle 6, a liner 8 for holding the propellant charge 2, a supporting ring 9, a head shell 10 coupled by the supporting ring 9 to the leftward end of casing 3, a supporting ring 11 and a nose cone 12. In FIGS. 3 and 4, the metal foil layers are shown at 13, the easily combustible adhesive layers are shown at 14 and a flame is shown at 16. In FIGS. 5 and 6, the inner metal foil layers are shown at 13, the easily combustible adhesive layers are shown at 14, the easily combustible metal foil layers are shown at 15 and the flame is shown at 16. In FIG. 7, there are shown the fin core 17, consisting of combustible laminates-like casing 3, the easily combustible adhesive layer 19 and the easily combustible metal foil 18. In FIG. 8 there are shown the fin core 17, the easily combustible metal foil 18, the easily combustible adhesive layer 19, the fitting 20 and the cap screw 22. In FIG. 9, there are shown the fin core 17, the fitting 20 and cap screws 21 and 22.

SUMMARY OF THE INVENTION

We have intensely studied various types of prior art rocket shells. We have discovered that a laminate of metal foils, each laminated with an adhesive, can afford combustible rocket shells without deterioration of the rocket performance. The combustible rocket shell in this invention is a cylindrical roll or plate, comprising a laminate of alternate layers of metal foils and combustible adhesives. This shell is ignited and burnt after the propellant of the rocket has been burnt out and the shell is disintegrated and finally dissipates as finely divided metal oxide particles.

More specifically, the shell of this invention is made of a laminate consisting of a plurality of inner layers made of high tensile strength metal foils bonded together by intermediate easily combustible adhesive layers containing an oxidizing agent, the inner and outer surface layers of the shell consisting of an easily combustible metal foil, whereby the metal foils will be disintegrated when the adhesive layers burn.

In the shell of this invention, the high tensile strength metal foil used for the inner layers is of a material selected from the group consisting of high tensile strength steel, titanium, zirconium and aluminum alloys. The easily combustible metal foil of the inner and outer surface layers is of a material selected from the group consisting of aluminum, magnesium and thermit.

The adhesives can be substances which can be readily burned in atmospheres of low oxygen content at a high altitude. However, they must contain in the combustion gas thereof oxidizing components in an amount sufficient to oxidize the metals. Consequently, they can be composed of mixtures of ordinary organic adhesives, inorganic oxidizing agents, and additives. The foregoing adhesives include polyurethane, polybutadiene, epoxy, and phenol resins, and nitrocellulose. The inorganic oxidizing agents include nitrates and perchlorates of ammonium, alkali metals and alkaline earth metals. The additives are agents for controlling the combustion, such as boron, aluminum, zirconium powders, and iron oxides. These components are usually mixed in a blender at room temperature, and the mixture is then coated and laminated on the surface of a metal plate, and then is cured at room temperature or in a heated oven.

Figure 3:
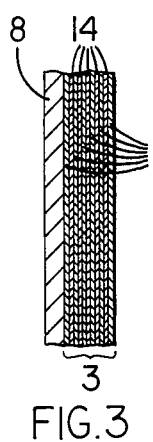
FIG. 3 is a cross section taken along line 3—3 in FIG. 2 and showing a comparison structure.
Figure 4:
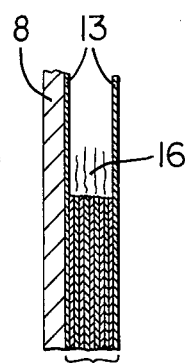
FIG. 4 is a view like FIG. 3, showing the condition when an incomplete combustion of the comparison structure has been carried out.
Figure 5:
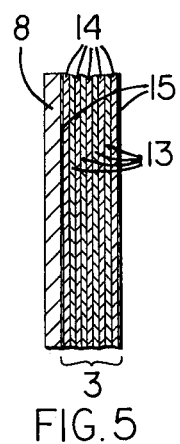
FIG. 5 is a view like FIG. 3, and showing an embodiment according to the invention.
Figure 6:
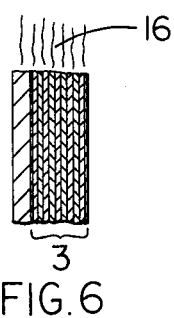
FIG. 6 is a view like FIG. 3 showing the condition when good combustion is performed according to the invention.

There are many methods for making the laminated shell which is required to have good combustibility and high tensile strength. The use of a high tensile strength metal foil and a combustible adhesive which is as thin as possible is required for satisfying the high tensile strength requirement of the rocket. However, we discovered that when the combustible adhesive layers 14 in FIG. 3 are reduced in thickness, at some point there occurs the phenomenon that although the interior metal foils 13 of the laminate can burn out, those on the surfaces remain unburnt, with the result being that all of them will not completely burn, as is shown in FIG. 4. This is due to the following reason: the combustible adhesives, when burned, evolve high-temperature oxidizing gases which act on both sides of the intermediate or inner foils, i.e. the foils that are positioned between two adhesive layers, whereby to oxidize and burn them, but these oxidizing gases act on only one side of the surface foils, that is, the foils have only one surface in contact with an adhesive layer. Therefore, this invention provides laminated shells wherein such surface metal foils in the laminated shell are replaced with more easily combustible metal foils 15 as shown in FIG. 5 and FIG. 6. When the easily combustible surface metal foils are made of materials identical to those used for the intermediate foils 13, the surface foils 15 must be thinner in order to avoid incomplete combustion thereof, whereas if the surface foils are made of a material which is more easily combustible than those of the intermediate foils 13, the surface foils 15 can be as thick as the intermediate foils 13. Usually, a high tensile strength foil suitable for rocket shells is made of a steel or alloy steel which is difficult to roll in a thickness of less than 20 to 30 microns by the conventional rolling techniques and it is originally poorly combustible. Other available materials can be selected from the group consisting of aluminum, magnesium, alloys essentially composed of these metals, and organic polymers, such as polyurethane, polycarbonate, polyvinylchloride, and nitrocellulose, because they are easily combustible.

In order to handle the rocket shell safely and to reduce the aerodynamic heating which occurs between the air and the shell during high speed flight of the rocket, it is desirable to use as surface foil materials aluminum, magnesium, or alloys mainly composed of these foregoing metals, because they melt at high temperatures and hence are easily combustible and have a high thermal conductivity.

The tensile strength of the laminate provided in this invention substantially depends on the tensile strength of the metal foil, but it is not significantly affected by the tensile strengths of the easily combustible adhesives. The approximate tensile strength of the laminate is represented by the following approximation equation:

$$\sigma = [n_A(t_A \times \sigma_A) + n_B(t_B \times \sigma_B)] \times \frac{1}{n_A t_A + n_B t_B},$$

wherein $\sigma$ represents the tensile strength of the laminate, $n_A$ and $n_B$ are the numbers of foils A and B, $\sigma_A$ and $\sigma_B$ are the tensile strengths of the foils A and B, $t_A$ and $t_B$ represent the thicknesses of foils A and B, respectively.

In order to make the laminate mentioned above into the shape of a rocket shell, nose cone and supporting rings, a degreased foil of a prescribed size is coated with a layer of an easily combustible adhesive whose thickness is large enough to burn out the foil, and the coated foil is rolled or wound spirally around a mandrel and then cured. An appropriate number of such foils is laminated in the above-described fashion to form the rocket shell and the other rocket parts noted above.

A flat-plate laminate, such as a fin, can be obtained by laminating and curing foils coated with an easily combustible adhesive by conventional methods, and also it can be made by cutting and flattening a foil laminate previously wound around a mandrel and then curing the foil laminate.

Figure 9:
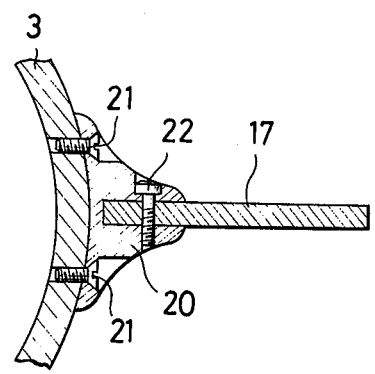
FIG. 9 is a fragmentary view showing a comparative structure.

This invention also provides a special method for attaching the fins to the rocket chamber. The fins 1 in FIG. 1 must withstand sufficiently the force generated during high-speed flight. In the conventional rockets, the fin 17 is fixed with a cap screw 22 or welded to the rocket chamber as shown in FIG. 9. The difficulties in attaching the fins onto a rocket chamber which is constructed of a laminate of high tensile strength metal foils, or fiber-reinforced plastics, stem from the following reasons: (1) the chamber wall is very thin, (2) although composite materials are high in tensile strength, they have a small delamination strength between the foils or in the strength between fibers in fiber-reinforced plastics. It is well-known, according to the current methods, to increase the thickness of the shell to the extent sufficient to withstand the internal pressure exerted by working of the rocket motor and sufficient to effect the required attachment of the fins. Suitable materials are additionally employed for reinforcement. However, according to all of these conventional methods, the rocket becomes heavy, so that its flight performance is greatly lowered and such a rocket is difficult to construct.

Figure 7:
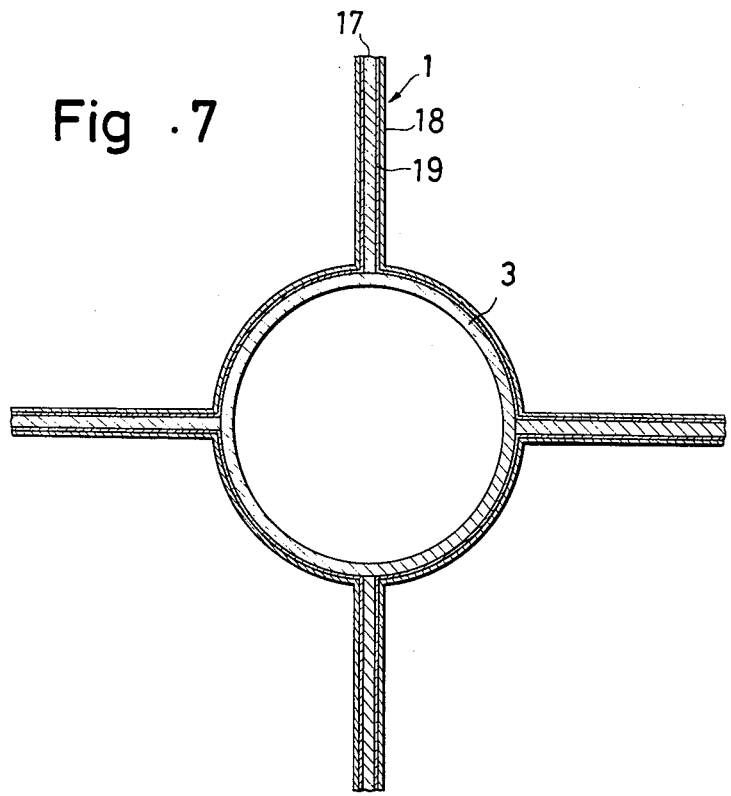
FIG. 7 shows a cross section taken along line 7—7 in FIG. 1.
Figure 8:
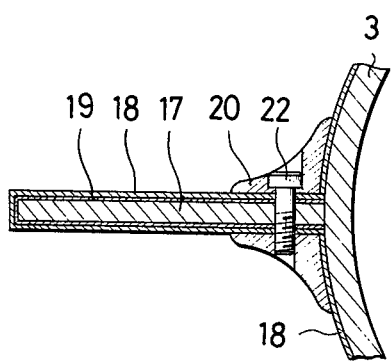
FIG. 8 is a fragmentary view showing an embodiment of the invention.

In this invention, the fin cores 17, which are made of foil-adhesive laminates like the shell 3, can be attached to the rocket chamber by means of an outer high tensile strength foil 18 by using an easily combustible adhesive layer 19. Thus, the fins can be fixed at any given positions on the rocket chamber, as indicated in FIG. 7. In other words, the fin cores 17 are fixed on the rocket chamber 3 along with outer metal foils 18 by means of easily combustible adhesive layers 19. The method of adhering each of the metal foils 18 principally must be varied depending on the force exerted on the fins during rocket-flight. If it is satisfactory to fix the same with a relatively weak strength, an outer foil may be used for the adhesion and the effective adhesion area may be locally small as shown in FIG. 7. However, in a large, high-speed rocket the fins 17 must be fixed strongly to the extent sufficient to withstand large bending forces. FIG. 8 indicates the method for fixing in this case. The foils 18 are fixed to the shell along with the fins by using an adhesive for making the foils envelope the fins and the shell in an integrated form, and are braced with the combustible fittings 20 and the cap screws 22 to withstand the bending force sufficiently.

This invention provides another method for fixing the end plate 4 on the rocket chamber. The end plate 4 is made of the same materials as those of the rocket shell. The end plate is a disk fitted to the inner surface of the shell and which is thick enough to withstand the internal pressure exerted thereon when the rocket motor operates.

This end plate 4 is tightly and directly fixed at the prescribed position on the shell with an adhesive. Since the plate cannot have adequate pressure resistance strength due to quality characteristics of the laminate if only this joining method is applied, a supporting ring 5 is attached to the inner surface of the shell by means of an adhesive, or together with a cap screw. The ring 5 is made of the same laminate as those of the rocket shell.

Figure 1:
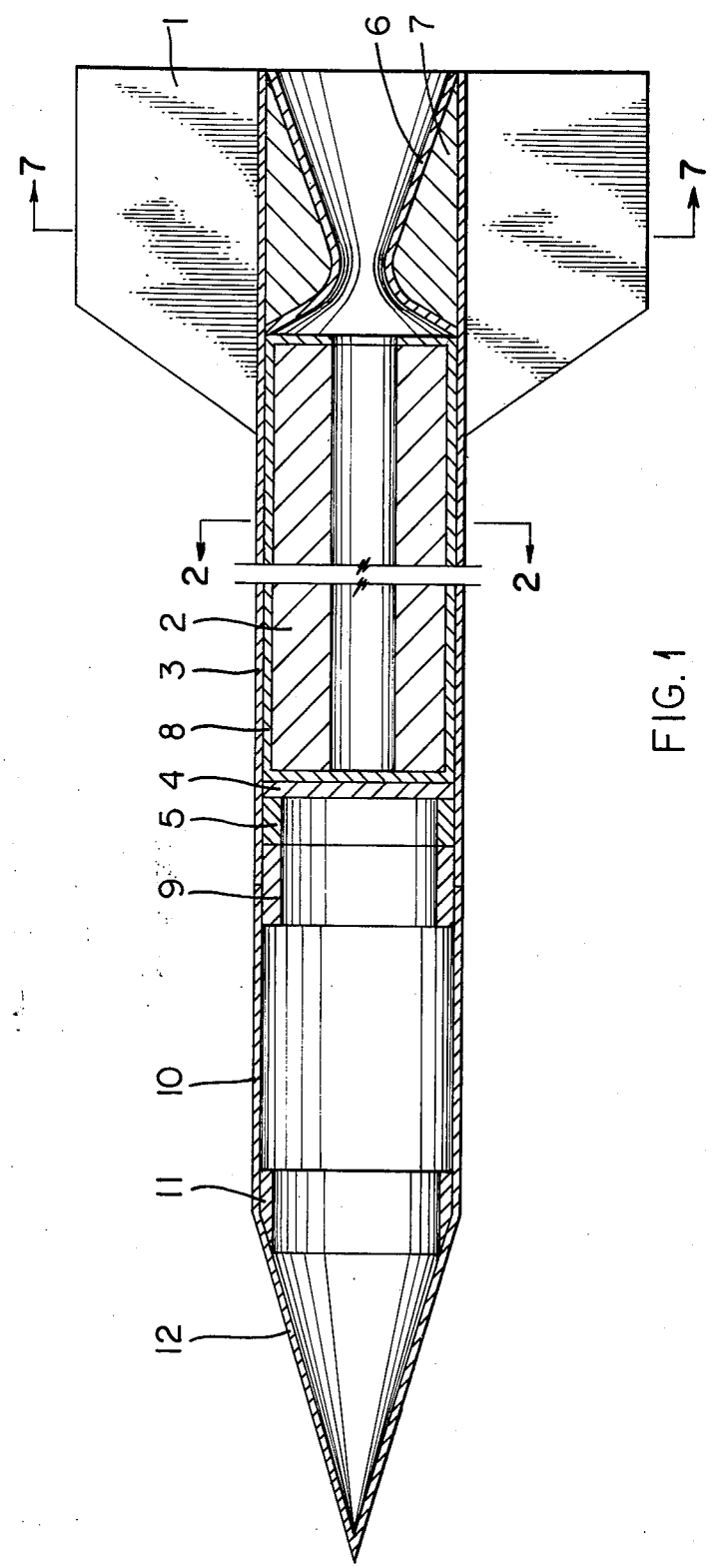
FIG. 1 is a longitudinal sectional view of the combustible rocket of the present invention.
Figure 2:
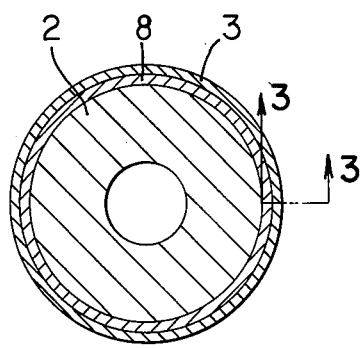
FIG. 2 is a cross section taken along line 2—2 in FIG. 1.

Further, in this invention the combustible rocket nozzle in FIG. 1 is mainly composed of a flame-resistant layer 6, and the combustible filler layer 7, and it is adhered and fixed to the shell. The nozzle surface which contacts the flame must keet its original shape during rocket operation and, moreover, it must burn out after its operation has finished. Hence, the flame resistant layer 6 essentially consists of a laminate of carbon fibers or cloths and a phenolic resin. The layer is burnt out by oxidizable gases which are evolved by combustion of the combustible filler layer. The combustible filler layer 7 comprises (1) an oxidizable component selected from the group consisting of nitrates and perchlorates of ammonium, alkali metals, and alkaline earth metals, (2) an organic fuel binder selected from the group consisting of polyester resins, epoxy resins, and the like, and (3) an additive for controlling the combustion temperature, the combustion rate, and density. The cured product of the filler layer is made in such a manner that it has enough strength to withstand the internal pressure of the shell.

DESCRIPTION OF THE PREFERRED EMBODIMENTS

Preferred embodiments of this invention shall be illustrated by the following Examples.

EXAMPLE 1

Onto both surfaces of steel foils of 0.05 mm thickness (tensile strength 70 kg/mm$^2$), there was coated a layer of 0.3 mm thickness of an easily combustible adhesive having the composition set forth in Table 1. Ten of the thus-coated plates were superposed and aluminum foils of 0.1 mm thickness, which had been coated on one side with a layer of 0.3 mm thickness of the foregoing easily combustible adhesive, was applied thereon to form the upper and lower layers of the laminate. After curing, at room temperature the resulting laminated plate has a tensile strength of 11.8 kg/mm$^2$. When burnt, the plate disintegrated.

Table 1

| epoxy resin | 20 parts |
|---|---|
| aluminum powder | 5 parts |
| potassium perchlorate | 75 parts |

EXAMPLE 2

Aluminum and steel foils were coated with an easily combustible adhesive and rolled on the surface of a mandrel to give a cylindrical laminate of 122 mm in inner diameter which was comprised of the same components as described in Example 1.

The laminate exhibited a bursting strength of 73 kg/cm$^2$. When the cylinder was ignited at its end surface, it smoothly burnt and disintegrated.

EXAMPLE 3

A mandrel whose shape conformed to the shape of the nozzle 6 was coated with a releasing agent and then was rolled with five layers with carbon cloth impregnated with phenolic resin, and then finally cured by heating at 120° C. Into the exterior part of the cured nozzle 6 as shown in FIG. 1, a combustible filler 7 having the components in Table 2 was packed to give the nozzle of the shape shown indicated in FIG. 1. The nozzle was fitted in a rocket motor and underwent a combustion test. It was found that the rocket operated under normal conditions and then the nozzle completely burnt out.

Table 2

| epoxy resin | 20 parts |
|---|---|
| potassium perchlorate | 80 parts |

The embodiments of the invention in which an exclusive property or privilege is claimed are defined as follows:

1. A completely combustible rocket comprising a rocket shell constructed of a laminate of high tensile strength metal foils, easily combustible metal foils and easily combustible adhesive layers, the easily combustible metal foils being of a different material than the high tensile strength metal foils.

2. A combustible rocket as set forth in claim 1 wherein the high tensile strength metal foil is made of a material selected from the group consisting of high tensile strength steel, titanium, zirconium, and aluminum alloys.

3. A combustible rocket as set forth in claim 1 wherein the easily combustible metal foil is made of a material selected from the group consisting of aluminum, magnesium, and thermit.

4. A combustible rocket as set forth in claim 1 wherein the easily combustible adhesive comprises organic polymers, oxidizing agents, and additives.

5. A combustible rocket as set forth in claim 4 in which said organic polymer is selected from the group consisting of epoxy resins, polyester resins, polyurethane resins, polybutadiene resins and phenolic resins.

6. A combustible rocket as set forth in claim 4 in which said oxidizing agent is one or a mixture of nitrates or perchlorates of alkali metals, alkaline earth metals and ammonium.

7. A combustible rocket as set forth in claim 4 in which said additive is a powder of a metal or a metal oxide of one or more metals selected from the group consisting of aluminum, magnesium, boron, and zirconium.

8. A combustible rocket as set forth in claim 1 wherein said easily combustible metal foil is the outer layer of the rocket shell.

9. A combustible rocket as set forth in claim 1 including combustible fins adhesively secured to the rocket shell.

10. A combustible rocket as set forth in claim 9 including combustible fittings secured to the fins and to the rocket shell.

11. A combustible rocket as set forth in claim 1 including an end plate of combustible material disposed inside said rocket shell and fixed thereto with a supporting ring and an adhesive.

12. A combustible rocket as set forth in claim 1 including a rocket nozzle disposed inside the rocket shell, said rocket nozzle consisting of a flame resistant layer and a combustible filler layer.

13. A combustible rocket as set forth in claim 12 wherein the flame resistant layer is a laminate comprising carbon cloths or carbon fibers, and a phenolic resin.

14. A combustible rocket as set forth in claim 12 wherein the combustible filler layer comprises organic polymers, oxidizing agents, and additives.

15. A combustible rocket as set forth in claim 14 wherein the organic polymer is selected from the group consisting of polyester resins, epoxy resins, phenolic resins, and fluorine resins.

16. The combustion rocket as set forth in claim 14 wherein the oxidizing agent is one or a mixture of nitrates and perchlorates of alkali metals, alkaline earth metals, and ammonium.

17. A combustible rocket nozzle as set forth in claim 14 wherein the additive is a powder of a metal or a metal oxide of one or more metals selected from the group consisting of aluminum, magnesium, boron, zirconium, iron, and copper.

18. A combustible rocket as set forth in claim 1 including a combustible nozzle adhesively fixed on the rocket shell.

19. A combustible rocket as set forth in claim 1 in which the rocket shell has an internal chamber for holding a propellant charge and having therein, adjacent one end of the charge, a nozzle for directing the products of combustion of the charge outwardly of the shell, a plurality of fins mounted on the exterior of the shell adjacent the nozzle for guiding flight of the rocket, an imperforate end plate disposed inside the shell adjacent the head end of the propellant charge and a supporting ring for supporting said end plate, and a nose cone attached to said shell at the end thereof opposite said fins, said shell being made of a laminate consisting of a plurality of inner layers made of high tensile strength metal foils bonded together by intermediate easily combustible adhesive layers containing an oxidizing agent, the inner and outer surface layers of said shell consisting of an easily combustible metal foil, whereby said metal foils will be disintegrated when said adhesive layers burn.

20. A combustible rocket as set forth in claim 1, wherein said easily combustible metal foil comprises the surface layers of the rocket shell.

21. A combustible rocket as set forth in claim 20, wherein the high tensile strength metal foil is made of a material selected from the group consisting of high tensile strength steel, titanium, zirconium and aluminum alloys, and wherein the easily combustible metal foil is made of a material selected from the group consisting of aluminum, magnesium and thermit.

22. A combustible rocket as set forth in claim 1, wherein the high tensile strength metal foil is made of a material selected from the group consisting of high tensile strength steel, titanium, zirconium and aluminum alloys, wherein the easily combustible metal foil is made of a material selected from the group consisting of aluminum, magnesium and thermit, and wherein the easily combustible adhesive comprises organic polymers, oxidizing agents and additives.

* * * * *